March 25, 1952 W. S. BRODES 2,590,501
EDUCATIONAL TOY
Filed Dec. 31, 1949 2 SHEETS—SHEET 1
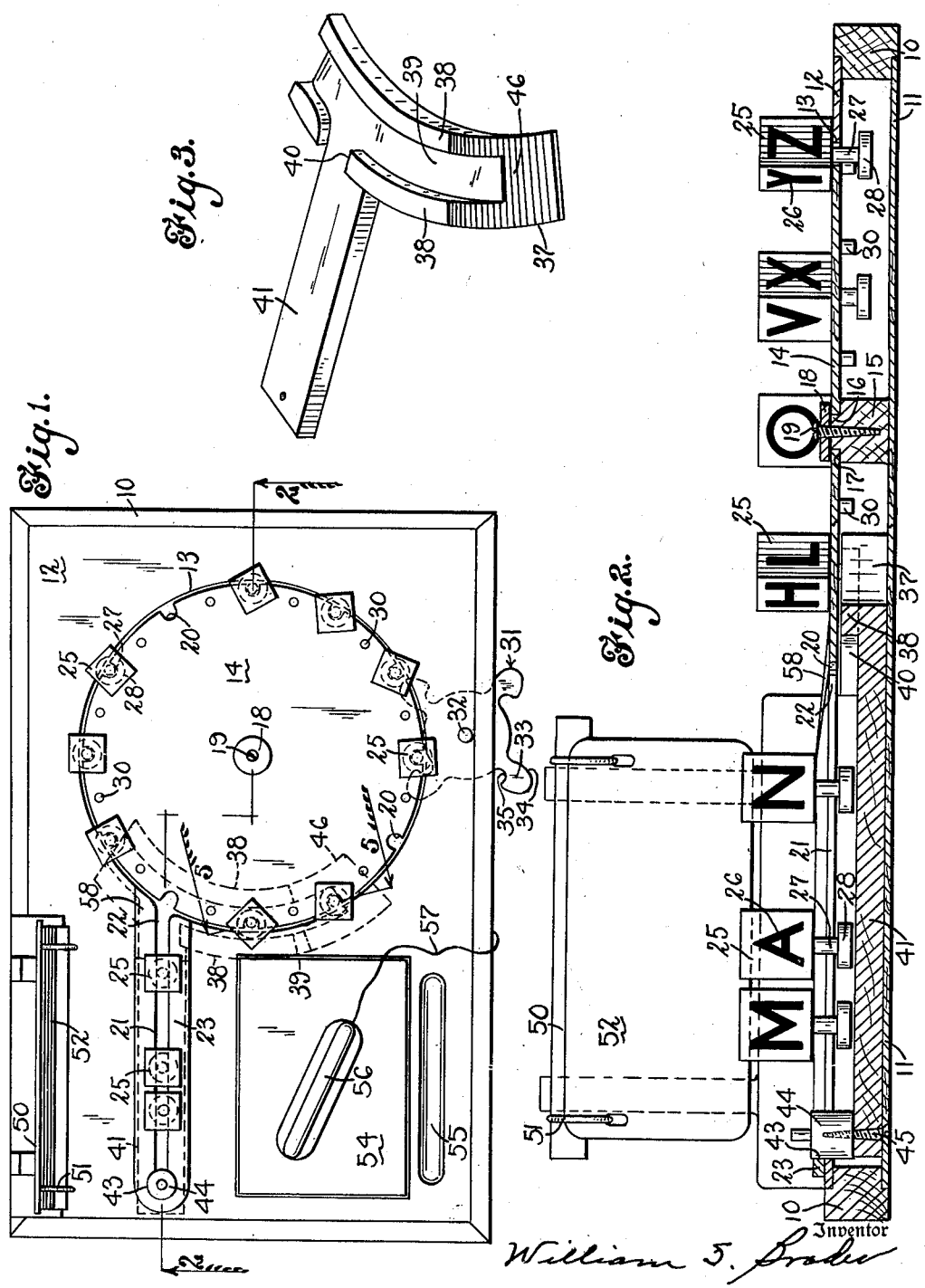
Inventor
William S. Brodes
By
Rockwell & Bartholow
Attorneys March 25, 1952     W. S. BRODES     2,590,501
EDUCATIONAL TOY Filed Dec. 31, 1949     2 SHEETS—SHEET 2

Inventor
William S. Brodes
By
Rockwell & Bartholow
Attorneys

Patented Mar. 25, 1952

2,590,501

UNITED STATES PATENT OFFICE 2,590,501

EDUCATIONAL TOY

William S. Brodes, New Haven, Conn.

Application December 31, 1949, Serial No. 136,312

12 Claims. (Cl. 35—73)

This invention relates to an educational toy or appliance designed to be both instructive and amusing for children.

It particularly relates to a game board provided with a rotatably mounted disk or turntable designed to carry a plurality of blocks which contain letters on the sides thereof, the blocks being adapted to be brought opposite a slot in a stationary base or board adjacent the turntable so that the blocks may be moved into the slot and spell out a word or arrange some of the letters in the alphabet in desired combinations.

As illustrated, each of the blocks is provided with four vertical sides and will contain letters upon each side, and as these letters will not all be visible at the same time to the user of the device, provision is made during a part of rotation of the turntable for rotating the blocks so that the letters will become visible.

Also, as illustrated, the blocks are carried in a recess or notch, opening through the edge of the turntable, and, when these notches are brought opposite a slot in the base, the blocks may be moved from the turntable into this slot. Provision is made for rotating the turntable in a step-by-step movement and at the conclusion of each of the steps of movement one of the recesses or notches will be brought opposite the open end of the slot. The operator can easily tell from the operation of the device when the registration of one of the notches with the open end of the slot occurs so that the effect is the same as that of an indexing wheel which moves in a step-by-step movement to a certain pre-determined position.

Also, the device is so arranged that the blocks may not normally be removed from the board, but provision is made for removing them when desired.

One object of the present invention is to provide an amusing and instructive children's toy.

A further object of the invention is to provide an educational toy through which children may learn their letters and the spelling of simple words, and which will be sufficiently attractive to encourage its use.

A still further object of the invention is to provide an entertaining toy having educational value for children, the toy enabling the child to learn the letters of the alphabet and the spelling of simple words and which, at the same time, will be relatively simple to operate and which will consist of relatively few parts.

A still further object of the invention is to provide an educational toy having a rotatably mounted disk or turntable designed to carry a plurality of blocks having letters upon each of four upright sides, and means for effecting the rotation of the blocks on their axes during the rotation of the turntable.

A still further object of the invention is to provide a child's educational toy of the character described in which the blocks having the letters thereon may be moved from the turntable into a slot in which they will be aligned to spell simple words, the device being so constructed that the rotation of the blocks will take place just prior to the arrival of the blocks at the open mouth of the slot.

Another object of the invention is to provide a child's educational toy of the character described such that the blocks will be carried in recesses opening through the periphery of the turntable and the rotation of the turntable will be effected through a plurality of indexing movements so that the operator may readily align the recesses with the open mouth of the slot into which the blocks are moved.

To these and other ends the invention consists in the novel features and combinations of parts to be hereinafter described and claimed.

In the accompanying drawings:

Fig. 1 is a top plan view of an educational toy embodying my invention;

Fig. 2 is a sectional view on line 2—2 of Fig. 1;

Fig. 3 is a detail view of the cam track for effecting rotation of the blocks;

Figure 4:
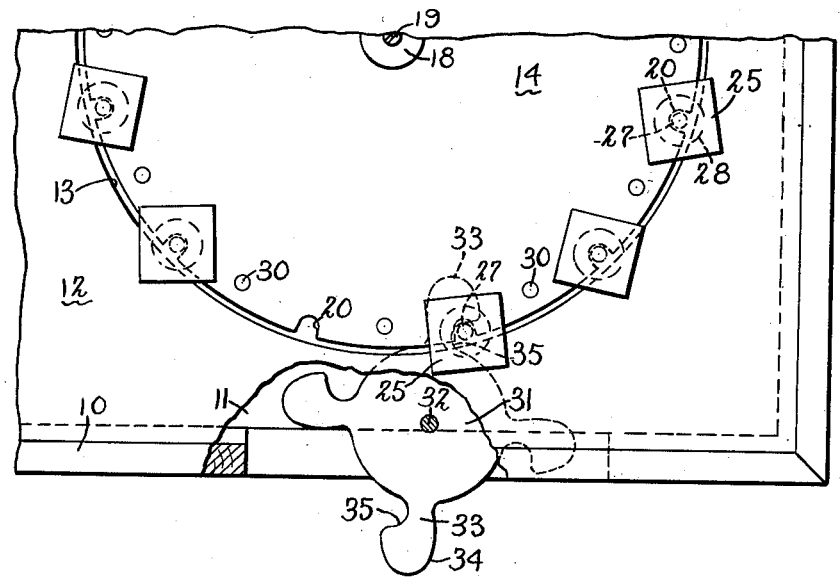
Fig. 4 is an enlarged top plan view of a portion of the turntable and associated parts.

To illustrate a preferred embodiment of my invention, I have shown a toy comprising a rectangular frame 10 having a lower base plate 11 and an upper base plate 12, these plates being spaced apart as shown in the sectional view of Fig. 2.

The upper base plate 12 is provided with a circular opening 13 and within this circular opening is rotatably mounted a disk or turntable 14.

A post 15 is secured to the base 11 and is provided with a reduced upper end 16 so as to provide an annular shoulder 17 upon which the turntable 14 rests so that it may rotate around the reduced upper end 16 of the post. The turntable may be secured in place by means of a washer 18 secured to the post by the screw 19.

The turntable is provided with a plurality of recesses or notches 20, these notches being arranged adjacent its edge and open through the edge of the turntable. The notches are normally closed by the edge of the opening 13 in the upper base plate 12. They are, however, adapted to communicate with an elongated slot 21 formed in the upper base plate 12, this slot being closed at one end but opening at the other end into the circular opening 13 so as to communicate with one of the recesses 20 when the recess lies opposite the open mouth 22 of the slot.

Secured upon the upper surface of the plate 12 is a U-shaped track or supporting member 23 provided with a slot which registers with the slot 21 so that, as will be hereinafter explained, when the blocks are moved into the slot 21 they will rest at their lower edges upon the track 23.

Carried by the turntable or disk 14 are a plurality of blocks 25, these blocks being of rectangular shape as shown, although this may be varied as desired, and being provided on each of the four vertical sides with letters or other desired characters 26. Secured to and depending from the blocks 25 are stems 27 having heads 28 at their lower ends. The pins 27 extend loosely through the recesses 20 of the turntable 14 and are normally held in these recesses by the edges of the opening 13, and the heads 28 on the pins 27 will prevent the blocks being detached from the turntable.

The turntable is also provided with a plurality of pins 30 which project downwardly from its lower surface and a star wheel 31 is rotatably mounted at 32 on the base of the device, which star wheel is provided with arms 33 extending outwardly through a slot in the frame member 10 so that they may be manually engaged by the user. The wheel 31 is designed to be rotated in a counter-clockwise direction as shown in Fig. 1 so that the rounded portions 34 of the arms 33 normally engage the pins 30 to effect the indexing or step-by-step rotation of the turntable 14. These arms are provided at their other sides with notches or hook-shaped portions 35 so that if the star wheel 31 is rotated in a clockwise direction, the hook-shaped portions 35 will engage the pins 27 on the blocks 25, as shown in Fig. 4, and lock both the disk and the star wheel against rotation in order that the device may always be rotated in one direction, which is a counter-clockwise rotation of the star wheel, but a clockwise rotation of the disk 14, as viewed in Fig. 1.

The spacing of the pins 30 is the same as that of the notches or recesses 20 so that each time the disk is moved through an angular distance equal to that between two adjacent pins, one of the recesses 20 will be brought into registration with the mouth 22 of the slot 21. The arms 33 are spaced slightly farther apart than the pins 30 so that, as shown in Fig. 1, when one of the arms 33 is on the point of disengaging one of the pins 30 the succeeding arm 33 will not yet be in position to engage the succeeding pin 30. There will, thus, be a slight lost motion between the star wheel and the turntable and the operator by the "feel" of the star wheel 31 can readily tell when one of the arms 33 passes out of engagement with one of the pins 30. He will thus know that the turntable has been properly indexed to bring one of the recesses 20 opposite the mouth 22 of the slot 21, which is the position shown in Fig. 1, so that one of the blocks can be moved from the turntable into the slot.

Figure 6:
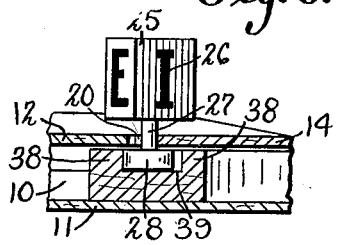
Fig. 6 is a sectional view on line 6—6 of Fig. 5.

As previously stated, letters or other characters are provided upon each of the four upstanding sides of the blocks 25 and as these letters are not all visible at the same time to a user positioned at the front of the device, provision is made for rotating the blocks on the axes of the pins 27 just prior to the time that the blocks reach the mouth of the slot 21 so that the operator may see the letters upon them and know whether or not the block is the proper one to move into the slot 21 to spell the desired word. By having letters on all four sides of the block and arranging for the rotation of the blocks in this manner, a smaller number of blocks may be employed and the size of the device reduced. To effect rotation of the blocks, a cam track, shown in Fig. 3, is provided below the periphery of the turntable. This cam track is of U-shaped form having a lower base portion 37 and spaced upstanding sides 38, providing between them a track 39 within which the heads 28 of the pins 27 are received. This cam track is of arcuate shape and is of the same radius as the turntable 14 so as to lie below the periphery of the turntable to be in the proper position to receive the heads of the pins. As shown in the sectional view of Fig. 6, the track is so located that the heads 28 of the pins 27 will be urged by the closed ends of the recesses 20 against the outer wall 38 of the track and, thus, effect rotation of the blocks about their axes as the turntable is rotated about its axis. The outer wall 38 of the cam track is provided with an opening 40 which registers with the mouth 22 of the slot 21 and integrally secured to the track is an arm 41 extending below the slot 21, which arm may be secured to the lower base plate 11 of the frame.

As has already been explained, the blocks will normally be prevented from being detached from the frame. In case it is desired to remove the blocks, however, an enlarged opening 43 is provided in the supporting member 23 and also in the upper base plate 12 at the closed end of the slot 21. This opening 43 is sufficiently large to admit passage of the heads 28 of the pins 27 therethrough, but it may be normally closed by a plug 44 secured in position by a screw 45. Removal of the screw 45 will permit the plug 44 to be lifted from the opening 43 and the blocks may then be removed from the device.

Figure 5:
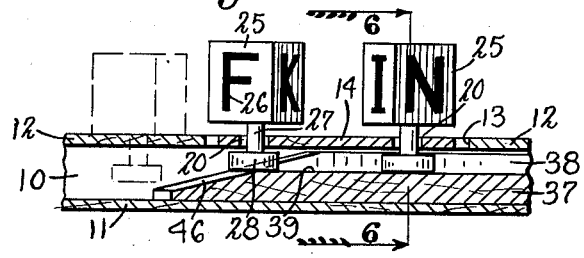
Fig. 5 is a sectional view on line 5—5 of Fig. 1.

At the end of the cam track at which the heads 28 enter the channel 39, the track may be beveled, as shown at 46 in Figs. 1 and 5 so that the portion upon which the heads 28 of the pins 27 ride will slope upwardly, thus raising the blocks from contact with the turntable 14 and the upper base plate 12 (it will be noted that the base of the blocks normally rest partly on the turntable and partly on the upper plate 12 as shown in Fig. 2) so that the blocks will be free to rotate with relatively small amount of friction.

At one of the rear corners of the frame is provided an easel 50 upon which may be hinged at 51 a plurality of charts 52 containing combinations of letters or simple words which it is desired to spell, so that a chart may be exposed which contains a desired word and the user of the device may then operate it to bring the blocks into the slot 21 in position to spell the word upon the chart.

Also, there may be arranged, adjacent the slot 21, a slate or blackboard 54 upon which the user may write or print the word which has been spelled out by the blocks, so that he will not only learn to spell the word, but will also learn to print or write the letters and words constructed therefrom. A recess 55 may be provided in the plate 12 for a piece of crayon and an eraser 56 may be secured to the frame by the cord 57 so that the words may be erased after they have been written.

It will be noted that the upper surface of the supporting member 23 stands above the upper surface of the plate 12 and the inner edge of this member is beveled, as shown at 58 (Fig. 2), so that the blocks will slide readily into the slot 21 resting upon the edges of the slot in the member 23.

The operation of my device is as follows. The proper chart 52 may be displayed, which carries the word it is desired to spell, and it will be understood that at the beginning of the operation, all of the blocks will be located in the recesses 20 of the turntable 14. The latter may be rotated by means of the star wheel 31 to bring one of the recesses after another successively into registration with the mouth 22 of the slot 21, the rotation of the turntable being properly indexed so that it may be rotated in a step-by-step movement, each step being substantially equal to the distance between the recesses 20. As the blocks are carried about and approach the inclined end or ramp 46 of the cam track 39, the blocks will be raised slightly from frictional engagement with the turntable and the base 12, as shown for example in Fig. 5, and will be rotated by contact of the heads 28 of the pins 27 with the outer upstanding wall 38 of the cam track. The user may, therefore, note the letters upon all four sides of the blocks as they are rotated on their axes and, when the proper block arrives opposite the mouth of the slot 21, this block is moved into the slot. The operation is then repeated until all of the blocks are moved into the slot 21 which are necessary to spell the work shown upon the exposed chart 52.

As stated above, the user can readily detect the lost motion between the star wheel 31 and the pins 30 owing to the fact that there will be a small movement of the wheel 31 after a forward arm has left one of the pins and before the succeeding arm engages the next pin, at which time there will be no drag upon the wheel. The free movement of the wheel will indicate to the user that the recess 20 has been properly indexed with the mouth 22 of the slot 21.

While I have shown and described a preferred embodiment of my invention, it will be understood that it is not to be limited to all of the details shown, but is capable of modification and variation within the spirit of the invention and within the scope of the claims.

What I claim is:

1. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, and means on the base member arranged to engage a part of the blocks during rotation of the turntable and rotate the blocks relatively to the turntable.

2. An educational toy comprising a base member having a circular aperture therein and a slot opening into said aperture, at turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means for effecting rotation of said blocks relatively to the turntable, said means comprising an element mounted on the base in position to engage a part of the blocks as they are moved past said element, and means for rotating the turntable.

3. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means, effective upon rotation of the turntable for effecting rotation of said blocks relatively to the turntable, and means for rotating the turntable, said last-named means comprising spaced members on said turntable, and a rotatable element on the base adapted to engage said members in sequence.

4. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, and means to rotate said turntable, said means comprising spaced members on said turntable, and an element rotatably mounted on the base having arms adapted to engage said spaced members in sequence.

5. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, and means to rotate said turntable, said means comprising spaced members on said turntable, and an element rotatably mounted on the base having radially projecting spaced arms successive ones of which are adapted to engage successive ones of said spaced members.

6. An educational toy comprising a base member having a circular aperture therein and a slot opening into said aperture, a turnable rotatably mounted in the aperture,, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means for rotating said turntable in a step-by-step movement, said rotating means comprising a multi-armed actuator rotatably mounted on the base member, and means connected with the turntable and engaged by successive ones of said arms, and each of said steps bringing one of said recesses to a position opposite the mouth of the slot.

7. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means for effecting rotation of the blocks relatively to the turntable, said means comprising a cam track below the turntable, and means on the blocks engaging said track.

8. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means for effecting rotation of the blocks relatively to the turntable, said means comprising a cam track below the turntable, and members secured to said blocks and depending therefrom below the turntable to engage said track.

9. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means for effecting rotation of the blocks relatively to the turntable, said means comprising a cam track below the turntable, and members secured to said blocks and depending therefrom below the turntable to engage said track, said blocks normally resting upon the turntable, and means on said cam track to raise said blocks from frictional engagement with the turntable.

10. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means to effect rotation of the turntable to move the blocks in a circular path, and means to effect rotation of the blocks on their axes by the rotation of the turntable.

11. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means to rotate the turntable to move the blocks in a circular path, and means on the base member in position to engage a part of the blocks at a predetermined point in the rotation of the turntable and rotate the blocks relatively to the turntable.

12. An educational toy comprising a base member having a circular aperture therein and a slot opening into said aperture, a turntable rotatably mounted in the aperture, the upper surface of which is substantially in the same plane as that of the upper surface of the base member, said turntable having a plurality of spaced apart recesses opening through the edge thereof adapted to selectively communicate with said slot, blocks rotatably supported in said recesses to be moved by the rotation of the turntable to a position opposite the mouth of the slot, means to effect rotation of the turntable to move the blocks in a circular path, said blocks having members depending therefrom below the turntable, and means on the base engaging said members to effect rotation of the blocks relatively to the turntable.

WILLIAM S. BRODES.

REFERENCES CITED

The following references are of record in the file of this patent:

UNITED STATES PATENTS

| Number | Name | Date |
| --- | --- | --- |
| 207,319 | Tatham | Aug. 20, 1878 |
| 676,313 | Healey | June 11, 1901 |
| 814,653 | Healey | Mar. 6, 1906 |
| 1,138,807 | Spitler | May 11, 1915 |
| 1,682,151 | Soldane | Aug. 28, 1928 |
| 2,138,532 | Wobensmith | Nov. 29, 1938 |